(12) United States Patent
Scruggs et al.

(10) Patent No.: US 8,905,592 B2
(45) Date of Patent: Dec. 9, 2014

(54) LIGHTING SYSTEM FOR VIDEO CONFERENCING

(76) Inventors: Ben O. Scruggs, Prairie Village, KS (US); Michael A. Jarchow, Danville, CA (US)

(*) Notice: Subject to any disclaimer, the term of this patent is extended or adjusted under 35 U.S.C. 154(b) by 547 days.

(21) Appl. No.: 13/135,063

(22) Filed: Jun. 24, 2011

(65) Prior Publication Data
US 2012/0275167 A1 Nov. 1, 2012

Related U.S. Application Data

(60) Provisional application No. 61/517,960, filed on Apr. 28, 2011.

(51) Int. Cl.
| | | |
|---|---|---|
| F21S 4/00 | (2006.01) | |
| F21V 7/06 | (2006.01) | |
| F21V 21/08 | (2006.01) | |
| G03B 15/02 | (2006.01) | |
| F21V 7/00 | (2006.01) | |
| F21V 9/08 | (2006.01) | |
| F21V 13/04 | (2006.01) | |
| F21Y 101/02 | (2006.01) | |

(52) U.S. Cl.
CPC ............... *F12V 33/0052* (2013.01); *F21V 7/06* (2013.01); *F21V 21/0832* (2013.01); *G03B 15/02* (2013.01); *F21V 7/0083* (2013.01); *F21V 9/08* (2013.01); *F21V 13/04* (2013.01); *F21Y 2101/02* (2013.01)
USPC ............. 362/296.08; 362/249.02; 362/249.11

(58) Field of Classification Search
USPC ........ 362/296.08, 11, 16, 293, 243, 246, 241, 362/247, 249.02, 249.01, 285, 327, 329, 362/343, 346, 249.11
See application file for complete search history.

(56) References Cited

U.S. PATENT DOCUMENTS

| | | | |
|---|---|---|---|
| 2,142,964 A * | 1/1939 | Godley | 362/518 |
| 4,772,986 A * | 9/1988 | McNemor | 362/23 |
| 4,812,814 A | 3/1989 | Elliott | |
| 5,142,562 A | 8/1992 | Guichard et al. | |
| 6,040,891 A * | 3/2000 | Makino et al. | 355/46 |
| 6,530,678 B1 * | 3/2003 | Kirsten | 362/293 |
| 6,599,000 B2 | 7/2003 | Nolan et al. | |
| 6,641,284 B2 | 11/2003 | Stopa et al. | |
| 6,784,916 B2 | 8/2004 | Smith | |
| 6,971,767 B2 | 12/2005 | Agabekov et al. | |
| 7,631,979 B1 * | 12/2009 | Brown et al. | 362/3 |
| 7,677,746 B2 | 3/2010 | Brown | |
| 7,705,874 B2 | 4/2010 | Du Breuil | |
| 7,744,243 B2 | 6/2010 | Van De Ven et al. | |
| 7,841,729 B2 | 11/2010 | Geddes | |
| 2009/0147531 A1 | 6/2009 | Hsu et al. | |
| 2009/0273661 A1 | 11/2009 | Mauchly | |
| 2010/0309647 A1 | 12/2010 | Winkler et al. | |

* cited by examiner

*Primary Examiner* — Sharon Payne
(74) *Attorney, Agent, or Firm* — John C. McMahon

(57) ABSTRACT

A lighting system for video conferencing includes a reflector structure positioned in an enclosure and having one or more light sources positioned therein to reflect light in a selected direction. A diffuser lens plate overlies the reflector structure to diffuse light emanating from the reflector structure. The reflector structure may include a plurality of parabolic reflectors having the shape of circular paraboloids. The light sources may include LED's positioned at the parabolic foci of the reflectors. The diffuser lens plate is translucent and may be colored yellow to filter light from the LED's. The diffuser has a surface texture which diffuses light from the LED's.

7 Claims, 4 Drawing Sheets

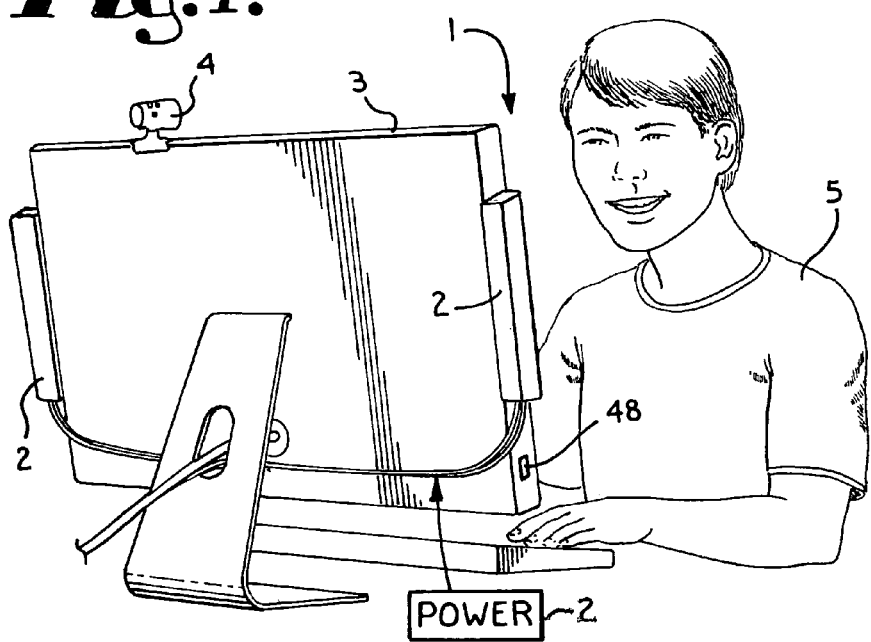
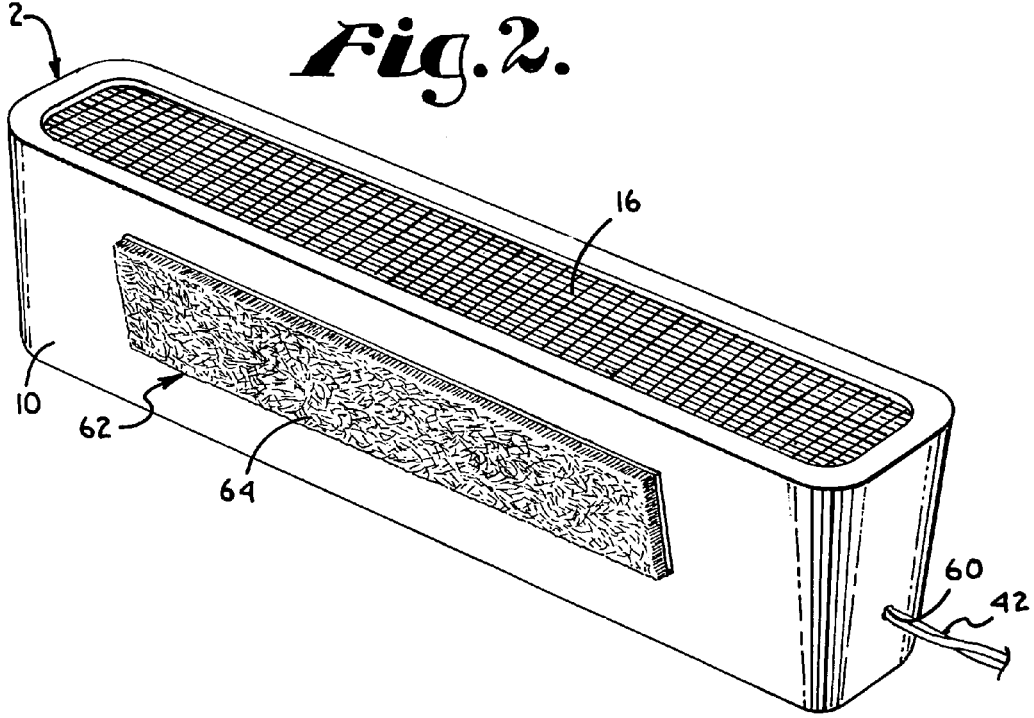

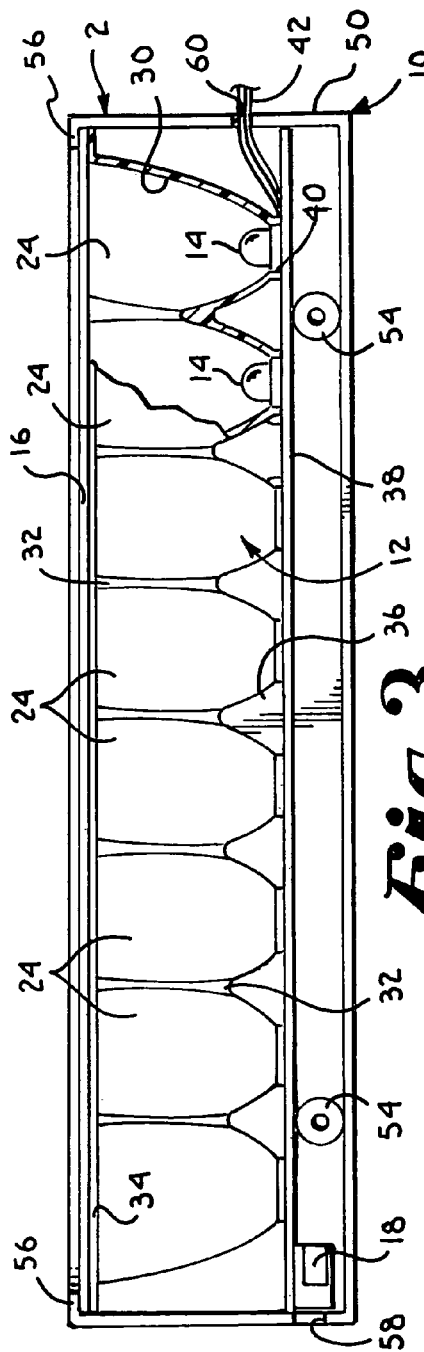
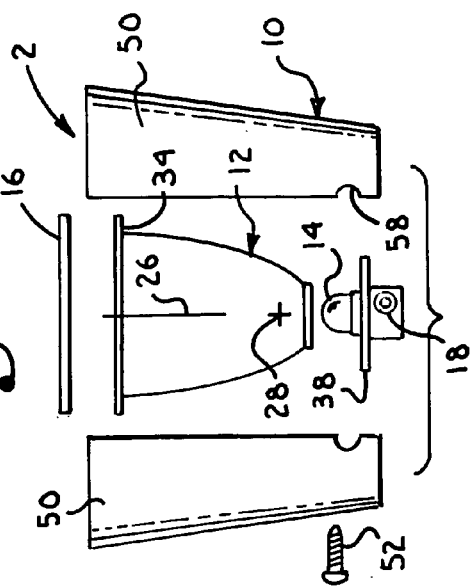

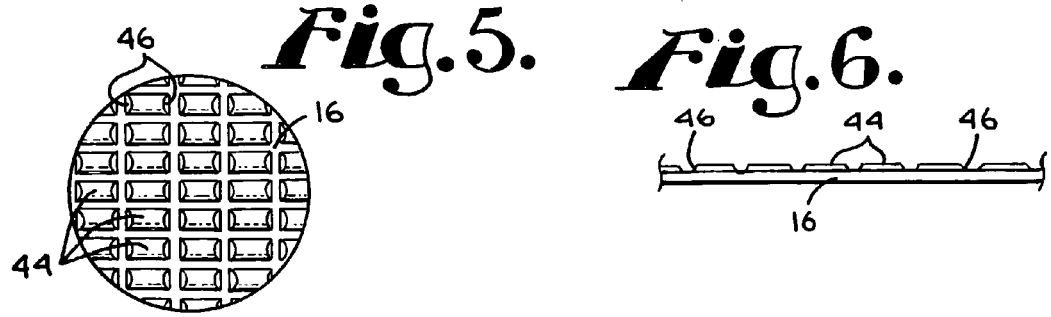
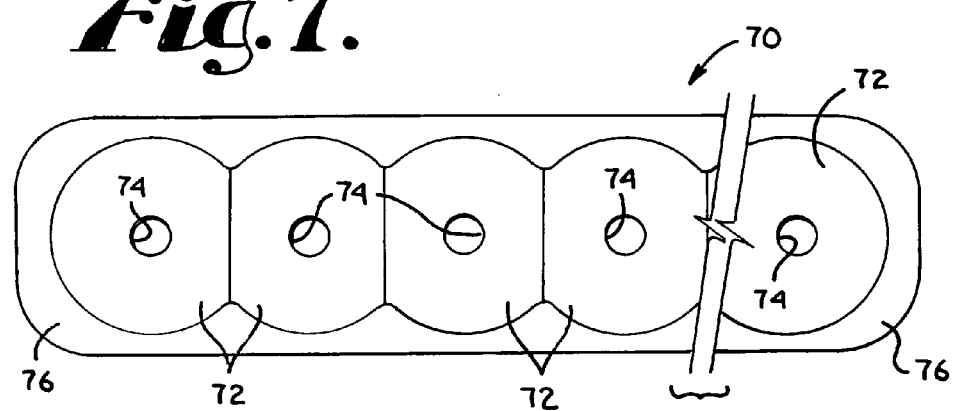
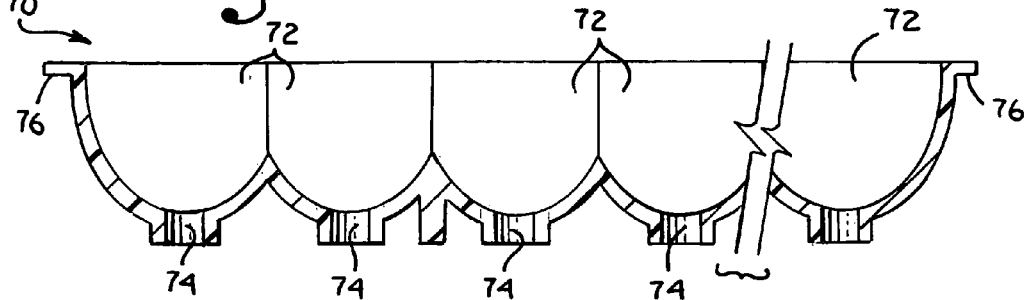

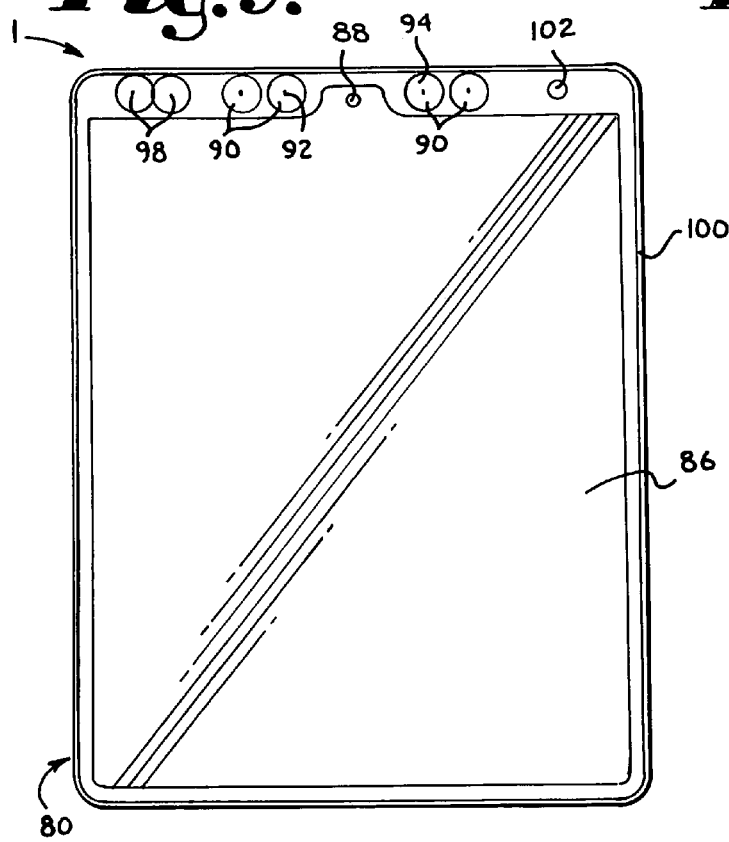
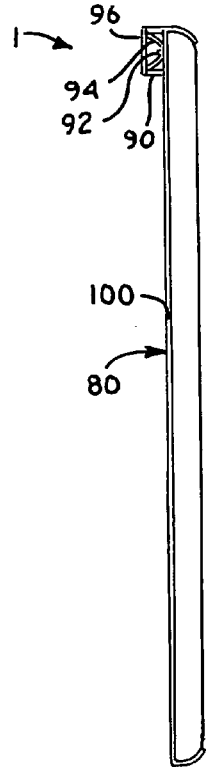
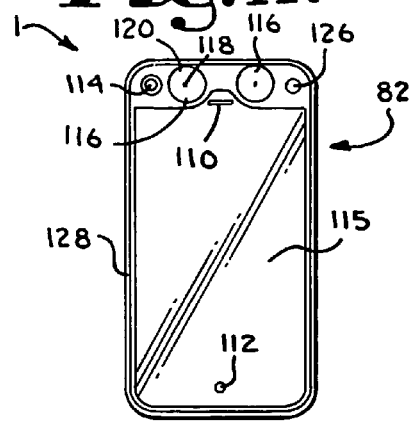
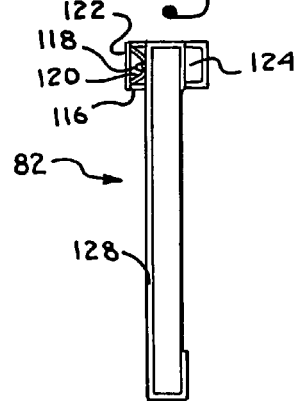

LIGHTING SYSTEM FOR VIDEO CONFERENCING

CROSS REFERENCE TO RELATED APPLICATIONS

This application claims the benefit of U.S. Provisional Application No. 61/517,960, filed Apr. 28, 2011, which is incorporated by reference herein.

BACKGROUND OF THE INVENTION

The present invention is broadly concerned with improvements in illumination devices and, more particularly, to improved lighting units for use in video conferencing type activities.

Video conferencing has become an useful form of communication between parties for remotely conducting various forms of business, corporate meetings, training, and the like without traveling for face-to-face meetings. On a smaller or personal scale, videophone service or videotelephony enables individuals to communicate vocally and visually using special equipment. Early videophone devices used slow scan imaging techniques resulting in the periodic exchange of still images. More recent imaging techniques approach full motion, real-time video imaging.

Inexpensive video cameras and microphones have been developed for interfacing to personal computers to enable vocal and visual communication over the Internet. Web cameras or webcams can be attached to LCD (liquid crystal display) monitors, directed at the user, and interfaced to the computer through a USB (universal serial bus) port for acquiring live images of the computer user. A microphone mounted on a desk or the monitor is connected to a microphone input of the computer to receive the user's voice input. Many portable computer devices such as laptops, notebooks, netbooks, tablet computers, pad computers, and the like are provided with built-in video cameras and microphones. Most cellular or cell phones also have cameras capable of recording still or moving images. Such cameras and microphones enable computer users to engage in an informal kind of vocal and visual communication over the Internet, which is sometimes referred to as "video chatting".

One problem which often occurs with the types of video cameras provided on and for personal computers is that the color response of such cameras and the color of ambient lighting combine to result in an unflattering facial coloring of the person imaged by the cameras. Such color rendering problems occurred previously with color film imaging and were generally overcome by the use color correction filters which could be attached to the lens of the camera. Some degree of color correction could also be applied during printing of photographs from the developed color film. However, color correction filters are not generally available for aftermarket video cameras and video cameras built into computer devices and cell phones. In most cases, the aftermarket and built-in video cameras are not adapted to have color correction filters mounted thereon.

SUMMARY OF THE INVENTION

The present invention provides an improved lighting system for telepresence, video conferencing, videotelephony, and the like which provides more flattering video imaging of participants. The lighting system of the present invention includes one or more light units which can be mounted on a computer device such as a desktop computer monitor, a laptop, a notebook, a netbook, a tablet computer, a pad computer, a cell phone, or the like. The light unit or units illuminate the user of the computer device for video imaging of the user by a video camera associated with the computer device, for purposes of video conferencing, videotelephony, video chatting, or the like.

In an embodiment of the invention, a light unit includes a reflector structure having a light source, such as a light emitting diode (LED), positioned within the reflector structure to reflect light rays from the light source, a colored diffuser lens plate overlying the reflector structure, and a power connection to enable connection of a power source to the LED to cause illumination of it. Preferably, the reflector structure incorporates one or more parabolic reflectors which have the shape of a circular paraboloid. A circular paraboloid is the shape generated by rotation of a planar parabola about its parabolic axis. Preferably, each light source is positioned substantially at the parabolic focus of the paraboloid reflector. Light rays emanating from the parabolic reflector structure are substantially parallel or collimated. Preferably, the diffuser lens plate is translucent and yellow and may be textured in such a manner as to effectively diffuse the collimated light from the reflector structure. The light unit includes an enclosure having the reflector structure, the LED, and the diffuser plate mounted therein. The light unit also includes an attachment member for securing the unit to a computer device, such as a computer video display monitor, a tablet computer, a cell phone, or the like.

In an embodiment of the lighting system, the reflector structure includes a plurality of parabolic reflectors, each having the shape of a circular paraboloid. Each parabolic reflector has an LED mounted at the focus thereof. The reflectors may be stacked in a line so that parabolic axes thereof are in a common plane. The diffuser plate extends in overlying relation to all the reflectors. The reflector structure, LED's, and diffuser are mounted in an elongated enclosure. The attachment member may, for example, be a component strip of a hook and loop fastener which is adhered to the enclosure, with a cooperating strip of the hook and loop fastener adhered to the computer device. Alternatively, other types of attachment members are foreseen, such as double sided adhesive tapes, clamping arrangements, and the like. It is also foreseen that the computer devices could be designed to receive attachment structures of auxiliary lighting units.

In an embodiment of the lighting system, a pair of the light units are provided for securing to opposite sides of the computer device. The light units may be interconnected, as by a cable, for powering the LED's therein. The power source may be a transformer/power supply unit which is plugged into an AC outlet. It is foreseen that the power source could alternatively be a battery or batteries, including rechargeable types of batteries. In another alternative embodiment, the light units can be powered by current available from a universal serial bus (USB) port provided on the computer device, such as on desktop computer or monitor or on a laptop or notebook type computer.

In an embodiment of the diffuser lens the surface texture is in the form of a plurality of small, aligned frusto-cylindrical bumps. The frusto-cylindrical bumps have the shape of a cylinder intersected by a chordal plane parallel to a cylindrical axis of the cylinder. The frusto-cylindrical bumps may have angled end facets to provide additional diffusing of the light. It is foreseen that other types of diffusing surface textures or other types of diffusing elements could be employed.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a perspective view of a computer monitor with an embodiment of the lighting system for video conferencing according to the present invention.

FIG. 2 is an enlarged perspective view of an embodiment of a light unit of the lighting system.

FIG. 3 is a side elevational view of the light unit with a half of an enclosure removed to show internal details thereof.

FIG. 4 is an exploded end view of the light unit showing component parts thereof.

FIG. 5 is an enlarged fragmentary plan view of a diffusing lens plate of the light unit.

FIG. 6 is an enlarged fragmentary side elevational view of the diffusing lens plate of the light unit.

FIG. 7 is an enlarged fragmentary top plan view of an alternative low profile reflector structure of the light unit.

FIG. 8 is an enlarged fragmentary cross sectional view of the low profile reflector structure.

FIG. 9 is a top plan view of a, tablet computer at a reduced scale with a first alternative embodiment of a light unit of the lighting system of the present invention.

FIG. 10 is a side elevational view of the tablet computer with the first alternative light unit, with portions broken away to illustrate components thereof.

FIG. 11 is a top plan view of a cell phone at a reduced scale with a second alternative embodiment of a light unit of the lighting system of the present invention.

FIG. 12 is a side elevational view of the cell phone with the second alternative light unit with portions broken away to illustrate components thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a lighting system for telepresence, video conferencing, and similar activities, according to the present invention. In general, the system 1 includes one or more light units 2 which are secured or attached to a computer device 3 having a video camera 4 associated therewith to provide more flattering, or less unflattering, illumination of a person 5 imaged by the camera 4.

Referring to FIGS. 2-4, the illustrated embodiment of one of the light units 2 includes an enclosure 10 having a reflector structure 12 mounted in the enclosure 10 and one or more light sources 14 mounted in the reflector structure 12 to reflect light radiating from the activated light sources 14 through a diffuser lens plate 16. The light unit 2 includes a power connector 18 connected to the light sources 14 for connecting them to a power source 20 (FIG. 1) to activate the light sources 14 to thereby cause them to illuminate.

The illustrated reflector structure 12 is formed by a plurality of parabolic reflectors 24. Each parabolic reflector 24 is a circular paraboloid, which is the shape generated by rotating a parabola about a parabolic axis 26 (FIG. 4). Each parabolic reflector 24 has a parabolic focus 28 which is located along the parabolic axis 26. The geometry of parabolas, circular paraboloids, and parabolic axes and foci is well known and will not be detailed further. The inner surface 30 of each parabolic reflector 24 is reflective to light rays from the light source 14, as by the presence of a reflective coating (not shown). The shape of a parabolic reflector surface 30 is such that light from a light source 14 located at the parabolic focus 28 is reflected in rays parallel to the parabolic axis 26. Light radiated from the light source 14 is, thus, substantially collimated by the circular parabolic reflector 24 in which the light source 14 is mounted.

The reflector structure 12 may be formed by molding, with the reflectors 24 positioned so that their parabolic axes 26 are aligned in a plane and with adjacent reflectors 24 intersecting and connected by webs 32. The illustrated reflector structure 12 includes a mounting rim 34 and may include one or more screw bosses 36. The illustrated reflector structure 12 includes eight parabolic reflectors 24; however, it is foreseen that a greater or lesser number of reflectors 24 could be employed.

The illustrated light sources 14 are light emitting diodes or LED's. The LED's 14 are preferably of a high efficiency design and preferably emit white light. The illustrated LED's 14 are mounted on a printed circuit (PC) board 38 which aligns the LED's 14 with openings 40 in the parabolic reflectors 24. The board 38 includes conductive traces (not shown) to interconnect the LED's 14 with the power connector 18, which may be conventional cylindrical coaxial power socket or jack. The board 38 may also include other components, such as a current limiting resistor (not shown) or the like. The board 38 may also have a power cable or cord 42 connected thereto for connecting one light unit 2 to a second unit 2, as will be described below.

Referring to FIGS. 5 and 6, the diffuser lens plate or diffuser 16 has a surface texture or other quality which causes light rays emitted by the LED's 14 and reflected by the reflectors 24 to be diffused. The illustrated diffuser 16 is provided with a plurality of integrally molded protuberances or bumps 44 which function to diffuse light from the reflectors 24. The bumps 44 function as small lenses which refract light passing therethrough to thereby diffuse the light. The illustrated bumps 44 are partially cylindrical or frusto-cylindrical. The frusto-cylindrical shape is formed by a cylinder intersected by a chordal plane parallel to a cylindrical axis of the cylinder. The illustrated frusto-cylindrical bumps 44 additionally have end facets 46 which are angled relative to the axes of the cylindrical bumps 44 and provide additional diffusion of the light from the reflectors 24. It is foreseen that other types of surface features could be employed to provide the desired light diffusion.

The diffuser lens plate 16 is preferably formed of a translucent or transparent material which is colored yellow or amber to provide a desired color filtering or coloring of the light from the LED's 14. Yellow light has a wavelength in the range of about 570 to 580 nanometers (nm). The yellow light counteracts some of the unflattering aspects of the combination of the color response of the camera 4 and the ambient light which is commonly available. While the present invention is described as using white light emitting diodes 14 and a yellow colored diffuser lens plate 16, it is foreseen that yellow light emitting diodes and a colorless diffuser could be employed and would be functionally equivalent thereto.

The power source 20 for the light unit or units 2 can be a DC power supply which plugs into an AC outlet. Such power supplies are sometimes referred to as "wall warts". The power supply 20 may be connected to the power connector 18 of one light unit 2 of a set, with the other light unit 2 receiving power from the first by way of the power cable 42. It is foreseen that the power source 20 can, alternatively, be a universal serial bus (USB) port 48 (FIG. 1) of the computer device 3. A USB version 2.0 port can supply 5 volts at about 500 milliamperes (mA), or about 2.5 watts. The newer version 3.0 USB port is provides 5 volts at about 900 mA, or about 4.5 watts. The current limits of the USB port 48 used must be considered in designing the light unit 2 to avoid overloading the port. If necessary, a USB Y-cable (not shown) can be provided with the light units 2 to enable the units 2 to be connected to two USB ports 48. It is also foreseen that the light units 2 could be powered by rechargeable or replaceable batteries (not shown) which are positioned within the enclosure 10.

The illustrated enclosure 10 is formed in enclosure halves 50 which receive the circuit board 38 with LED's 14 thereon, the reflector structure 12, and the diffuser lens plate 16 therein. The enclosure halves 50 are joined, as by screws 52 received in enclosure screw bosses 54. In the illustrated enclosure 10, an assembly of the reflector structure 12 and the circuit board 38 joined by one or more screws (not shown) passing through the board 38 into a reflector structure screw boss 36 rests on the enclosure screw bosses 54. The diffuser 16 is sandwiched between the mounting rim 34 of the reflector structure 12 and an inwardly projecting lip 56 of the enclosure 10. The enclosure 10 is provided with a power jack opening 58 for access to the power connector 18 and a power cable opening 60 to enable passage of the power cable 42 out of the enclosure 10.

The enclosure 10 is provided with an attachment member 62 to enable securing the light unit 2 to a computer device 3. The illustrated attachment member 62 is a hook and loop fastener, with one component strip 64 of the hook and loop fastener adhered to the enclosure 10. A complementary component strip (not shown) is adhered to the computer device 3. The enclosure 10 is secured to the computer device 3 by pressing the hook and loop component strip 64 with the complementary strip on the computer device 3. It is foreseen that other types of attachment members 62 could be provided in the system 1 such as double sided adhesive tape, spring clamps, mechanical hanger devices, or the like.

FIGS. 7 and 8 illustrate a low profile reflector structure 70 formed by a plurality of parabolic reflectors 72 molded together into a single unit. Each of the reflectors 72 has the shape of a circular paraboloid, which are truncated at a lower height than the reflectors 24 of the reflector structure 12. Each reflector 72 has an opening 74 to receive a light source 14, such as an LED at a focus of the reflector 72. The reflector structure 70 may include a mounting rim 76 to facilitate mounting the structure in an enclosure 10. The reflector structure 70 is adapted for use with a more compact or low profile enclosure 10, as compared to the enclosure 10 shown in FIGS. 2-4.

The computer device 3 with which the system 1 is used is illustrated as a liquid crystal display or LCD monitor. The illustrated video camera 4 is an aftermarket type of web cam. Such cameras usually have a built-in microphone (not shown) and interface to a computer (not shown) through a USE port 48 which may be provided on the computer or on the monitor. A separate microphone (not shown) could be used in the absence of one built into the camera 4. It is foreseen that the video camera 4 could be built into the monitor. The computer device 3 could, alternatively, be an "all-in-one" computer (not shown), a laptop or notebook computer (not shown), a "netbook" computer (not shown), a tablet or pad computer 80 (FIGS. 9 and 10), a personal digital assistant (PDA) (not shown), a "smart" cell phone 82 (FIGS. 11 and 12), a conventional cell phone (not shown), or the like. Many of these devices have built-in cameras 4 and microphones.

Referring to FIGS. 9 and 10, the lighting system 1 of the present invention is adapted for use with a computer device 3, such as the tablet or pad computer 80 illustrated. A tablet computer 80, or simply tablet, is a complete mobile computer, larger than a mobile phone or personal digital assistant, with an integrated flat touch screen 86, and primarily operated by touching the screen. It often uses an onscreen virtual keyboard or a digital pen rather than a physical keyboard and a solid state drive rather than a conventional hard drive. In addition, tablets 80, also referred to as slate computers, usually incorporate some sort of wireless connectivity, such as Wi-Fi (trademark of the Wi-Fi Alliance, www.wi-fi.org) for communication over the Internet and Bluetooth (trademark of the Bluetooth Special Interest Group, www.bluetooth.org) for interfacing with peripheral devices. Many tablets 80 incorporate cell phone data connectivity. Many tablets 80 also are provided with a digital camera 88 which is capable of recording still images or moving images. The lighting system 1 of the present invention is adaptable to tablet computers 80 to provide more flattering lighting for a user 5 being imaged by the camera 88 provided on the tablet 80.

The illustrated tablet 80 includes four light units 90 positioned in groups of two spaced from a centerline of the tablet 80. Each of the light units 90 includes a light source such as an LED 92 positioned at a parabolic focus of a parabolic reflector structure or reflector 94, with a diffuser lens plate 96 overlying the LED 92 and reflector 94. The diffuser 96 may be colored yellow or, alternatively, the LED 92 may be a yellow light emitting diode. Preferably, the diffuser 96 has a surface texture or other quality which diffuses light emanating from the LED 92 and reflector 94. Electrical power for the illustrated LED's 92 is provided by a pair of batteries 98, which may be of a button cell type of battery. The light units 90 and batteries 98 of the illustrated tablet 80 are secured to the tablet by means of a fitted impact case 100, sometimes referred to as a bumper, into which the light units 90 and batteries 98 are incorporated. Various types of impact cases 100 may be provided by the manufacturer of the tablet 80 or by third parties. The case 100 may also be provided with a switch unit 102 operable to selectively interconnect the batteries 98 with the LED's 92 to activate them when the user 5 is being imaged by the camera 88. Preferably, the case 100 is of such a design that the batteries 98 can be conveniently replaced when necessary.

Referring to FIGS. 11 and 12, the lighting system 1 of the present invention is adapted for use with a small computer device 3, such as a smart cell phone 82. A smart phone is generally a mobile phone that offers more advanced computing ability and connectivity than a contemporary "feature" phone. Smart phones may be thought of as handheld computers integrated with a mobile telephone. Smart phones run complete operating system software providing a platform for application developers. Thus, they combine the functions of a camera phone and a personal digital assistant (PDA). There is some convergence in the capabilities of current tablet computers 80 and smart phones 82, the difference being principally in size.

The illustrated phone 82 has a speaker port 110, a microphone port 112, and a digital camera 114. A user interface for the phone 82 is accessed by a touch screen 115. The illustrated phone 82 is provided with a pair of light units 116 positioned in spaced relation from a centerline of the phone 82. Each light unit 116 includes a light source such as an LED 118 positioned at the parabolic focus of a parabolic reflector 120, with a diffuser lens plate 122 overlying the LED 118 and reflector 120. The LED's 118 are powered by a battery or batteries 124 (FIG. 12) through a switch 126 (FIG. 11). The diffuser 122 may be yellow colored, or the LED 118 can be a yellow light emitting diode to provide more flattering lighting of a user 5 being imaged by the camera 114. The light units 116, battery 124, and switch 126 can be incorporated into an impact case 128 for the phone 82, with an opening provided for the camera 114. In most respects, the lighting system 1 adapted for the smart phone 82 is similar to the system 1 adapted for the tablet computer 80.

While the light units 2 are shown as add-on units for the computer devices 3, it is foreseen that light units incorporating features of the present invention could also be built into computers, computer monitors and displays, and also within cell phones.

It is to be understood that while certain forms of the present invention have been described and illustrated herein, it is not to be limited to the specific forms or arrangement of parts described and shown.

What is claimed and desired to be secured by Letters Patent is:

1. A lighting system for illumination of a person's face for video imaging thereof and comprising:
   (a) a parabolic reflector structure including a plurality of intersecting parabolic reflectors connected by webs; each parabolic reflector having a circular paraboloid shape, a parabolic axis, and a parabolic focus; and the parabolic axes of said reflectors being fixed in substantially parallel relation and in a common plane;
   (b) a plurality of light emitting diodes (LED's), each LED being mounted substantially at the parabolic focus of an associated parabolic reflector;
   (c) a colored diffuser lens plate overlying said parabolic reflector structure whereby light from said LED's passes through said lens plate;
   (d) a power connection coupled to said LED's to enable connection of a power source thereto to cause illumination of said LED's;
   (e) a light unit enclosure having said reflector structure, said LED's, said diffuser lens plate, and said power connection mounted therein; and
   (f) an attachment member positioned on said enclosure to enable securing said enclosure to a computer device having a video camera associated therewith.

2. A system as set forth in claim 1 and including:
   (a) a pair light unit enclosures, each enclosure having a reflector structure, an LED, a diffuser lens plate, and a power connection mounted therein, and having an attachment member positioned thereon; and
   (b) said light unit enclosures being secured in spaced relation to a computer device having a video camera associated therewith.

3. A system as set forth in claim 1 wherein said attachment member includes:
   (a) a component of a hook and loop fastener secured to said enclosure.

4. A light unit as set forth in claim 1 wherein:
   (a) said diffuser lens plate is translucent and yellow colored.

5. A light unit as set forth in claim 1 wherein:
   (a) said diffuser lens plate includes a surface texture formed by a plurality of small, aligned, substantially frusto-cylindrical bumps.

6. A lighting system for illumination of a person's face for video imaging thereof and comprising:
   (a) a parabolic reflector structure including a plurality of intersecting parabolic reflectors connected by webs; each parabolic reflector having circular paraboloid shape, a parabolic axis, and a parabolic focus; and the parabolic axes of said reflectors being fixed in substantially parallel relation and in a common plane;
   (b) a plurality of light emitting diodes (LED's), each LED being mounted substantially at the parabolic focus of an associated parabolic reflector;
   (c) a translucent yellow colored diffuser lens plate overlying said parabolic reflector structure whereby light from said LED's passes through said lens plate;
   (d) said diffuser lens plate including a surface texture formed by a plurality of small, aligned, substantially frusto-cylindrical bumps;
   (e) a power connection coupled to said LED's to enable connection of a power source thereto to cause illumination of said LED's;
   (f) a light unit enclosure having said reflector structure, said LED's, said diffuser lens plate, and said power connection mounted therein; and
   (g) an attachment member positioned on said enclosure to enable securing said enclosure to a computer device having a video camera associated therewith.

7. A system as set forth in claim 6 wherein said attachment member includes:
   (a) a component of a hook and loop fastener secured to said enclosure.

* * * * *